(No Model.)
J. L. SHUTE.
PRESSING AND MOLDING MACHINE.
No. 470,513. Patented Mar. 8, 1892.
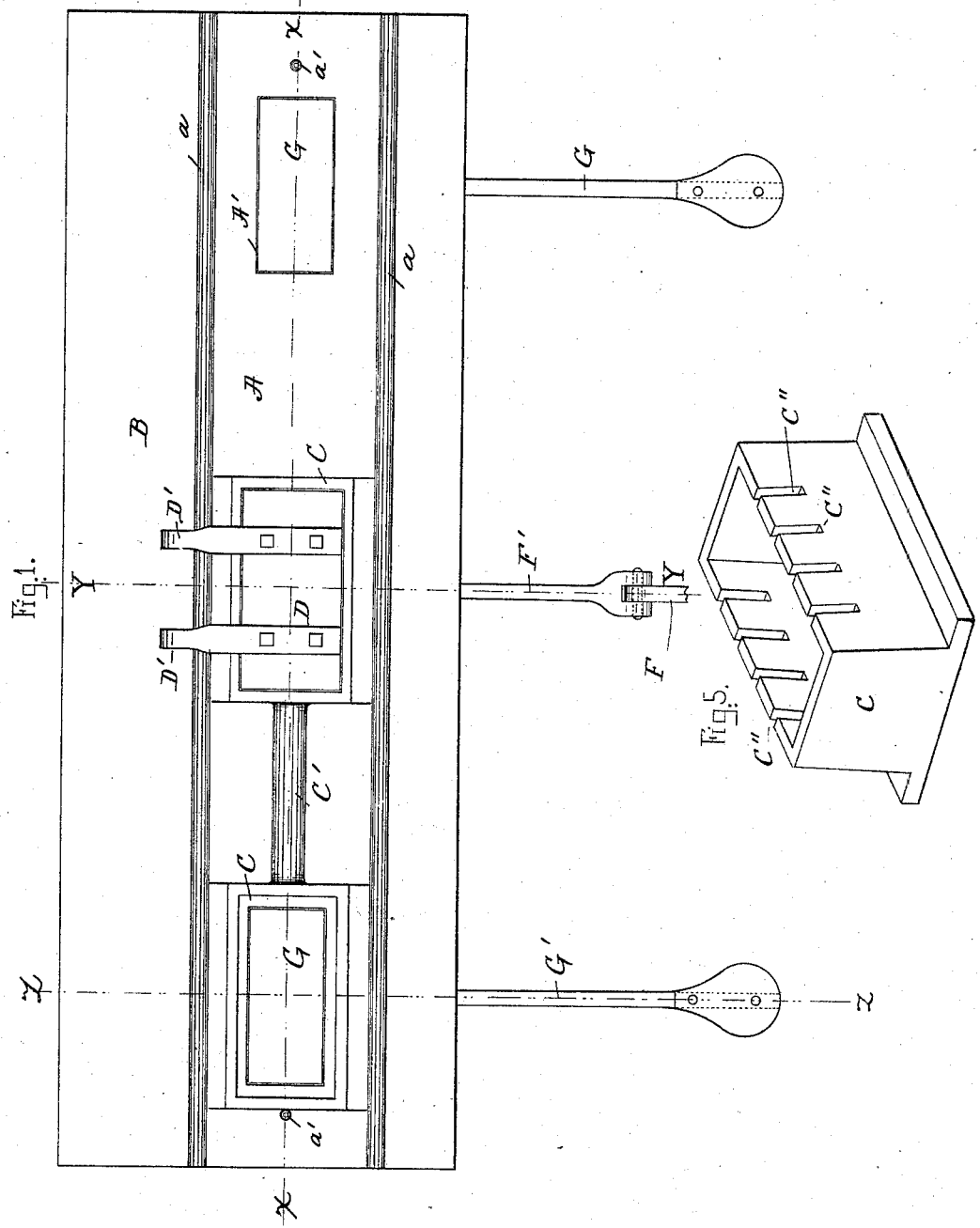
Witnesses.
Lauritz N. Möller
Alice A. Perkins.
Inventor.
James L. Shute
by Alvan Andrew
atty.

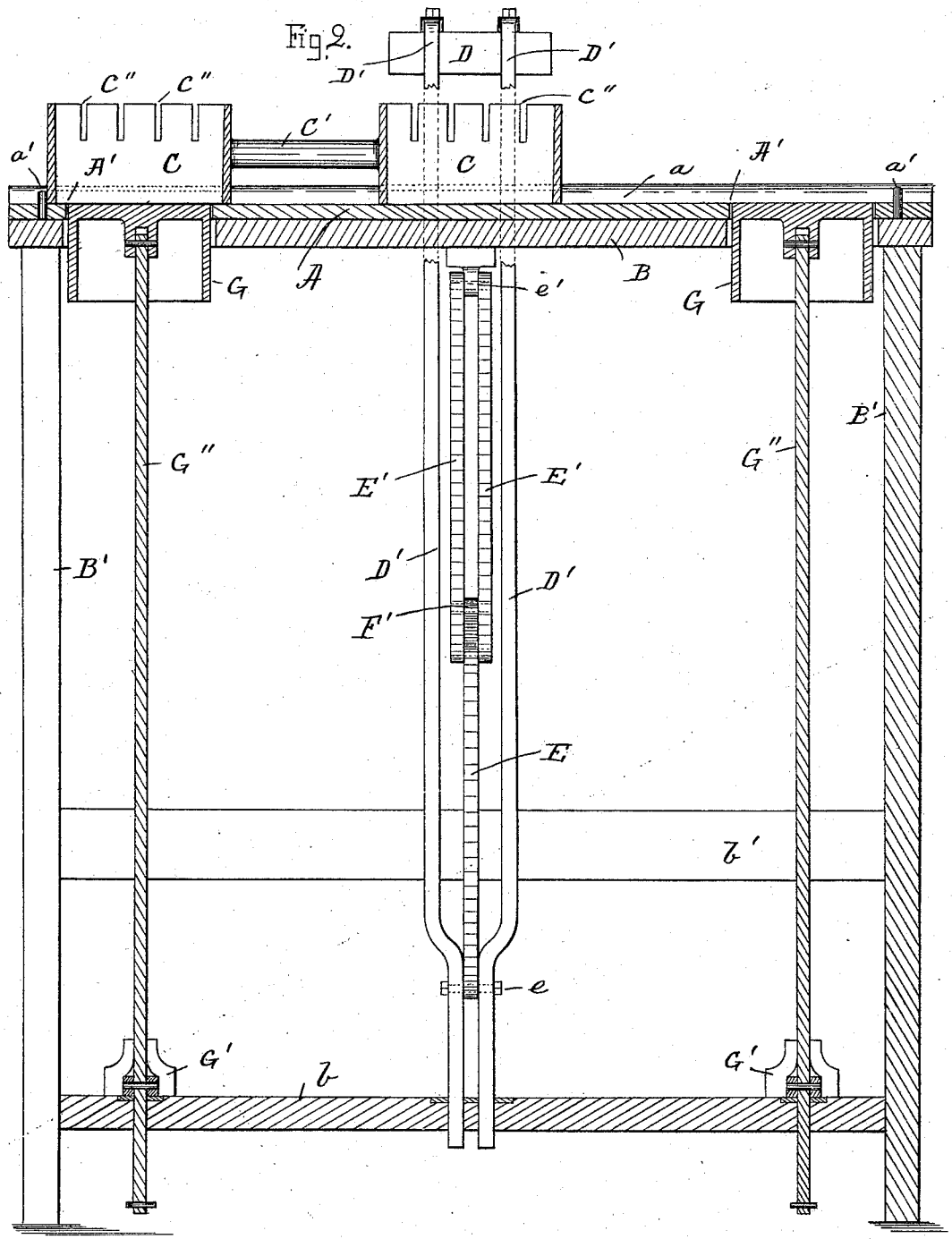

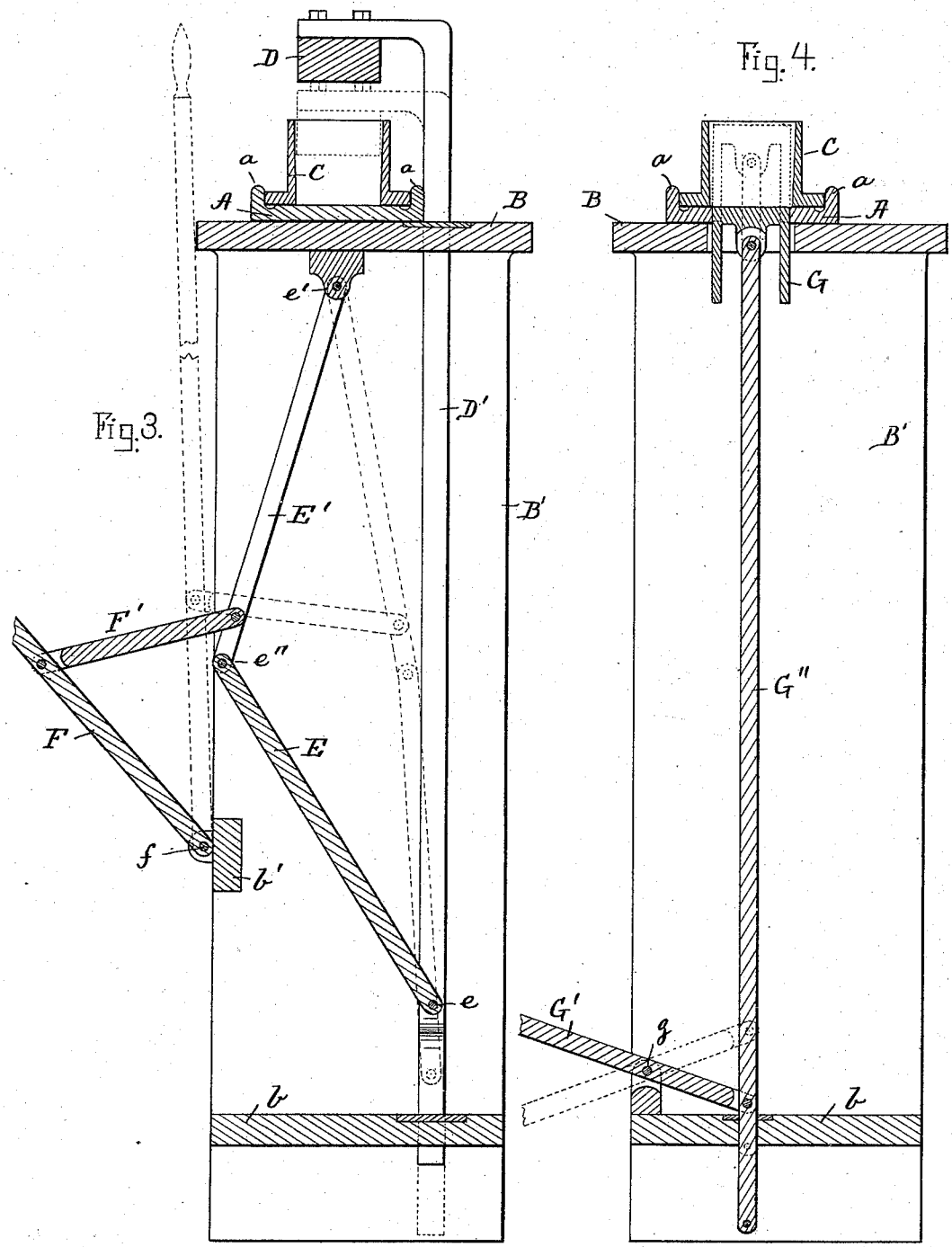

UNITED STATES PATENT OFFICE.

JAMES L. SHUTE, OF GLOUCESTER, MASSACHUSETTS, ASSIGNOR OF THREE-EIGHTHS TO WILLIAM T. MERCHANT, OF SAME PLACE.

PRESSING AND MOLDING MACHINE.

SPECIFICATION forming part of Letters Patent No. 470,513, dated March 8, 1892.

Application filed August 26, 1891. Serial No. 403,762. (No model.)

*To all whom it may concern:*

Be it known that I, JAMES L. SHUTE, a citizen of the United States, and a resident of Gloucester, in the county of Essex and State of Massachusetts, have invented new and useful Improvements in Pressing and Molding Machines, of which the following, taken in connection with the accompanying drawings, is a specification.

This invention relates to improvements in pressing and molding machines particularly designed for pressing and molding in brick forms fish, meat, or other food products, although it may to advantage be used for the purpose of pressing and molding other articles or materials, if so desired.

The invention is carried out as follows, reference being had to the accompanying drawings, wherein—

Figure 1 represents a plan view of the improved machine. Fig. 2 represents a longitudinal section of the same on the line X X in Fig. 1, showing a portion of the pressure device in elevation. Fig. 3 represents a cross-section on the line Y Y in Fig. 1. Fig. 4 represents a cross-section on the line Z Z in Fig. 1, and Fig. 5 represents a detail perspective view of one of the bottomless boxes in which the food or other articles is pressed and molded.

Similar letters refer to similar parts wherever they occur on the different parts of the drawings.

The invention consists of a stationary plate A, preferably made of metal and provided with suitable guides, between which the molds or boxes are longitudinally reciprocated. In the drawings I have shown such guides as made in the form of ribs $a$ $a$, projecting upwardly from the sides of the plate A; but this is not essential, as other or equivalent guides may be used without departing from the spirit of my invention.

The plate A is preferably secured in a suitable manner to a table B, having legs or standards B' B' and horizontal braces or stays $b$ and $b'$, as shown; but this is not essential, as the frame-work of the machine may be varied or constructed in any suitable or convenient manner.

On the plate A is longitudinally adjustable a pair of bottomless boxes C C, which are held at a proper distance apart by means of a rod C' or other equivalent rigid connecting device, as shown in the drawings. Said boxes are adapted to be moved forward and back on the plate A, are guided between the ribs $a$ $a$, and are limited in their reciprocating motion by coming in contact with stop-pins or projections $a'$ $a'$, preferably attached to the plate A near its ends, as shown in Figs. 1 and 2.

A' A' are orifices made through the plate A near its ends, as shown in Figs. 1, 2, and 4, the object of which will hereinafter be described; the remaining portion of said plate being solid, as shown. In connection with said molds or boxes I use a pressure device for pressing and molding the food or other articles in said boxes, and for this purpose I have shown in the drawings a vertically-adjustable pressure-block D, secured to a rod or rods D' D', adapted to slide up and down in bearings or guides in the table B and brace $b$ or other stationary part or parts of the machine.

E and E' are a pair of knuckle-levers pivoted together at $e''$, the lower end of the lever E being pivoted at $e$ to the pressure rod or rods D' and the upper end of the lever E' being pivoted at $e'$ to the table B or other stationary part of the machine, as shown in Fig. 3.

F is a hand-lever, the lower end of which is pivoted at $f$ to the brace $b'$ or other stationary part of the machine.

F' is a link pivoted in one end to the hand-lever F and in its other end to the system of knuckle-levers E E', as fully represented in Fig. 3. By swinging the lever F outward, as shown in full lines in Fig. 3, the pressure-block D is raised above the top of the box C to permit said box to be moved to one side of the pressure-block D after the contents of the box C have been properly molded and pressed. By swinging the lever F inward, as shown in dotted lines in Fig. 3, the block D is depressed and caused to enter that one of the boxes C which for the time being is arranged below said pressure-block, by which the contents of said box are caused to be compressed and molded. After the food or article has been pressed and molded, as above described, the boxes C C are moved to the right or left, as the case may be, so that the box containing the pressed articles comes directly above one of the orifices A' in the plate A, where the contents of the box are forced upward by means of a block G, fitting loosely in the orifice A', as shown in Fig. 4. The block G is forced upward by means of a treadle-lever G', pivoted at g and having its inner end connected to a rod or link G'', the upper end of which is pivoted or connected in a suitable manner to the discharge-block G, as fully shown in Fig. 4.

In operating the machine the boxes are intermittently reciprocated, causing them to come alternately below the pressure device and above the discharge devices. After the contents of one of the boxes have been discharged it is refilled with another quantity of food or other article to be pressed, while in the meantime the contents of the box below the pressure device have been compressed and molded by the action of the pressure-block D, which compresses the article or food against the solid part of the plate A and inside of the bottomless box C. As soon as the article or food has been compressed under the block D the latter is raised and the boxes moved, preferably by hand, so that the box containing the compressed article comes opposite to one of the plate perforations A' and its discharge-block, while the refilled box comes directly below the pressure-block, and so on during the operation of the machine.

When it is desired to tie the food by means of strings, I make notches C'' C'' in the sides of the boxes, as shown in Fig. 5, adapted to serve as guides in which the strings are laid, by means of which each brick or package is tied, as is common in food-molding devices.

Having thus fully described the nature, construction, and operation of my invention, I wish to secure by Letters Patent and claim—

1. A pressing and molding machine consisting of a table having a horizontal guideway and provided with a pair of orifices for the passage of a pair of discharge-blocks, a vertically-movable pressure-head arranged centrally between the said orifices, a pair of discharge-blocks arranged to ascend, respectively, through the orifices, a pair of connected bottomless mold-boxes slidable rectilinearly back and forth on the guideway of the table, and means for independently raising and lowering the pressure-head and discharge-blocks, substantially as described.

2. A pressing and molding machine consisting of a table, a vertically-movable pressure-head, a pair of vertically-movable discharge-blocks which rise and fall through apertures in the table at opposite sides of the pressure-head, a plate attached to the upper side of the table, having parallel guides and provided with orifices which register with the apertures in the table for the vertical movements of the discharge-blocks, a pair of connected bottomless mold-boxes slidable rectilinearly back and forth on the plate and retained by the guides thereof, a hand-lever mechanism for raising and lowering the pressure-head, and devices independent of the hand-lever mechanism for moving the discharge-blocks upward through the table and plate, substantially as described.

3. A pressing and molding machine consisting of a table, a vertically-movable rod guided by the table and having a pressure-head at its upper end, a pair of vertically-movable rods having discharge-blocks at their upper ends which rise and fall through the apertures in the table at opposite sides of the pressure-head, a plate attached to the upper side of the table, having parallel guides and provided with orifices which register with the apertures in the table for the vertical movements of the discharge-blocks, a pair of connected bottomless mold-boxes slidable back and forth on the plate and retained by the guides thereof, a lever mechanism for raising and lowering the rod which carries the pressure-head, and treadle mechanism for raising and lowering the pair of rods which carry the discharge-blocks, substantially as described.

In testimony whereof I have signed my name to this specification, in the presence of two subscribing witnesses, on this 22d day of August, A. D. 1891.

JAMES L. SHUTE.

Witnesses:
J. P. WITHAM,
P. W. MERCHANT.